United States Patent [19]

Ku

[11] Patent Number: 5,521,650
[45] Date of Patent: May 28, 1996

[54] CABLE TELEVISION TUNER

[75] Inventor: Hsi-Yung Ku, Taipei, Taiwan

[73] Assignee: Hwa Lin Electronic Co., Ltd., Taipei, Taiwan

[21] Appl. No.: 407,363

[22] Filed: Mar. 20, 1995

[51] Int. Cl.$^6$ ..................................... H04N 5/50
[52] U.S. Cl. ................. 348/731; 455/189.1; 455/296; 455/6.2; 333/32; 333/174
[58] Field of Search .................. 455/6.2, 77, 189.1, 455/191.1, 295, 296, 311, 307; 333/32, 174; 348/731

[56] References Cited

U.S. PATENT DOCUMENTS

| | | | |
|---|---|---|---|
| 4,206,412 | 6/1980 | Tsurumaru | 455/311 |
| 4,315,333 | 2/1982 | Yamashita | 455/189.1 |
| 5,203,019 | 4/1993 | Rinderle | 455/295 |
| 5,212,828 | 5/1993 | Hatashita | 455/295 |
| 5,321,847 | 6/1994 | Johnson, Jr. | 455/295 |

Primary Examiner—Victor R. Kostak
Assistant Examiner—R. Brian Johnson
Attorney, Agent, or Firm—Bacon & Thomas

[57] ABSTRACT

A cable television tuner including a tracking filter to receive the radio frequency signal of the cable television, microwave monolithic integrated circuit to changes the radio frequency signal into an intermediate frequency signal, an inband and outband matching network to match the impedance of the signal, a balance to unbalance transformer, a low pass filter to receive signal from the inband and outband matching network through the balance to unbalance transformer, a double tuned circuit device, a secondary mixer to changes the output signal of the double tuned circuit device, which is received from the low pass filter, into the desired intermediate frequency signal, a trap to remove the sound carrier frequency and image carrier frequency of the nearby channels from the signal received from the secondary wave mixer, ampli-filter to remove noises from the signal received from the trap, and an attenuator to attenuate the signal received from the ampli-filter so as to provide a satisfactory radio frequency output.

1 Claim, 2 Drawing Sheets

CABLE TELEVISION TUNER

BACKGROUND OF THE INVENTION

The present invention relates to tuners, and relates more particularly to a cable television (CATV) tuner which uses a tracking filter and a MMIC (microwave monolithic integrated circuit) to amplify and change the radio frequency signal of the cable television into an intermediate frequency signal, an inband and outband matching network to eliminate composite triple beat so as to provide a satisfactory intermediate frequency signal or channel signal.

During the transmission of a cable television radio frequency signal, the video signal and audio signal are converted into a RF (radio frequency) signal by a high power radio frequency modulator, and then the modulated radio frequency signal is sent through the program channel to the subscribers. As the bandwidth of the channel signal received at the subscribers' side is of broad bandwidth, noise and beat interference tend to occur when a conventional CATV tuner is used, causing the received picture affected. The problem must be improved.

SUMMARY OF THE INVENTION

The present invention has been accomplished to provide a CATV tuner which eliminates the aforesaid problem.

According to the present invention, when the CATV radio frequency signal is received, it is amplified and changed to an intermediate frequency signal by a MMIC, then processed through an inband and outband matching network, a balance to unbalance transformer, a low pass filter and a second local oscillator, and then processed through a secondary mixer, and then sent through a trap, an ampli-filter and an attenuator, and therefore composite triple beat is eliminated and a satisfactory intermediate frequency signal or channel signal is provided.

DETAILED DESCRIPTION OF THE PREFERRED EMBODIMENT

Figure 1:
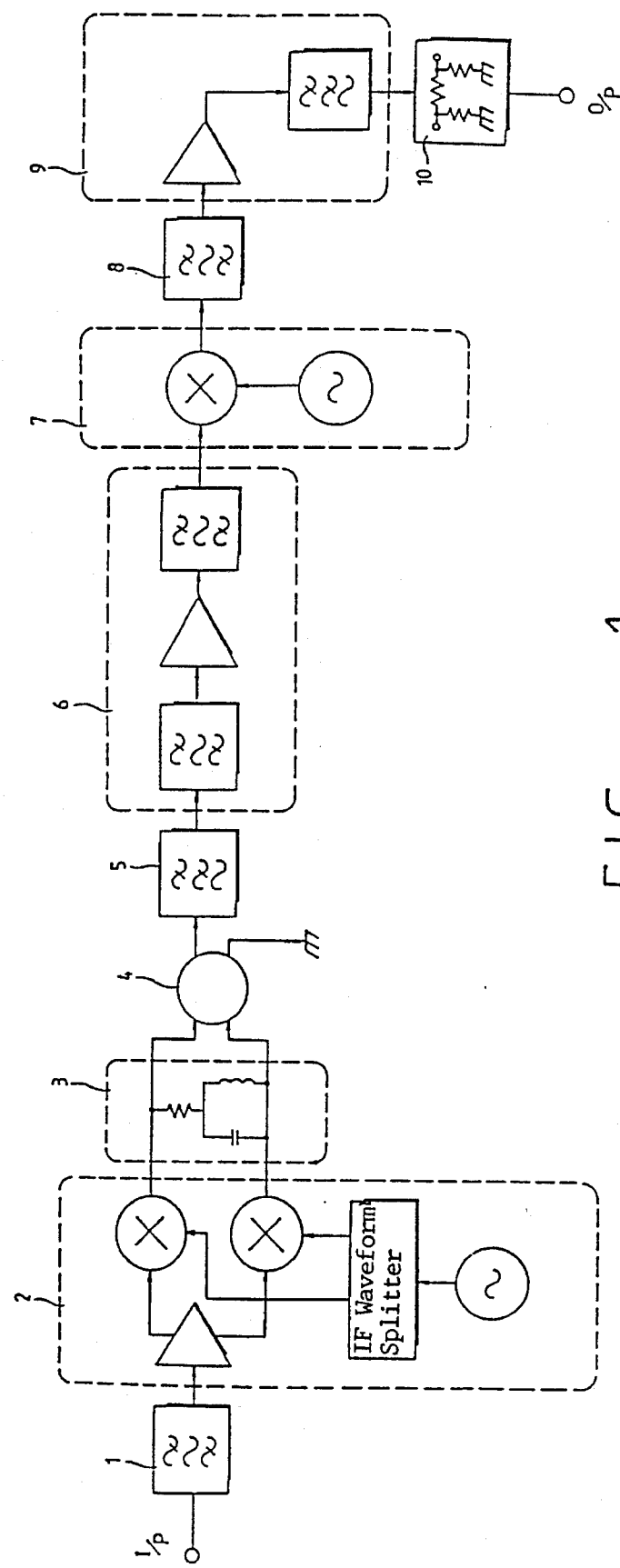
FIG. 1 is a circuit block diagram for a CATV (cable television) tuner according to the present invention.
Figure 2:
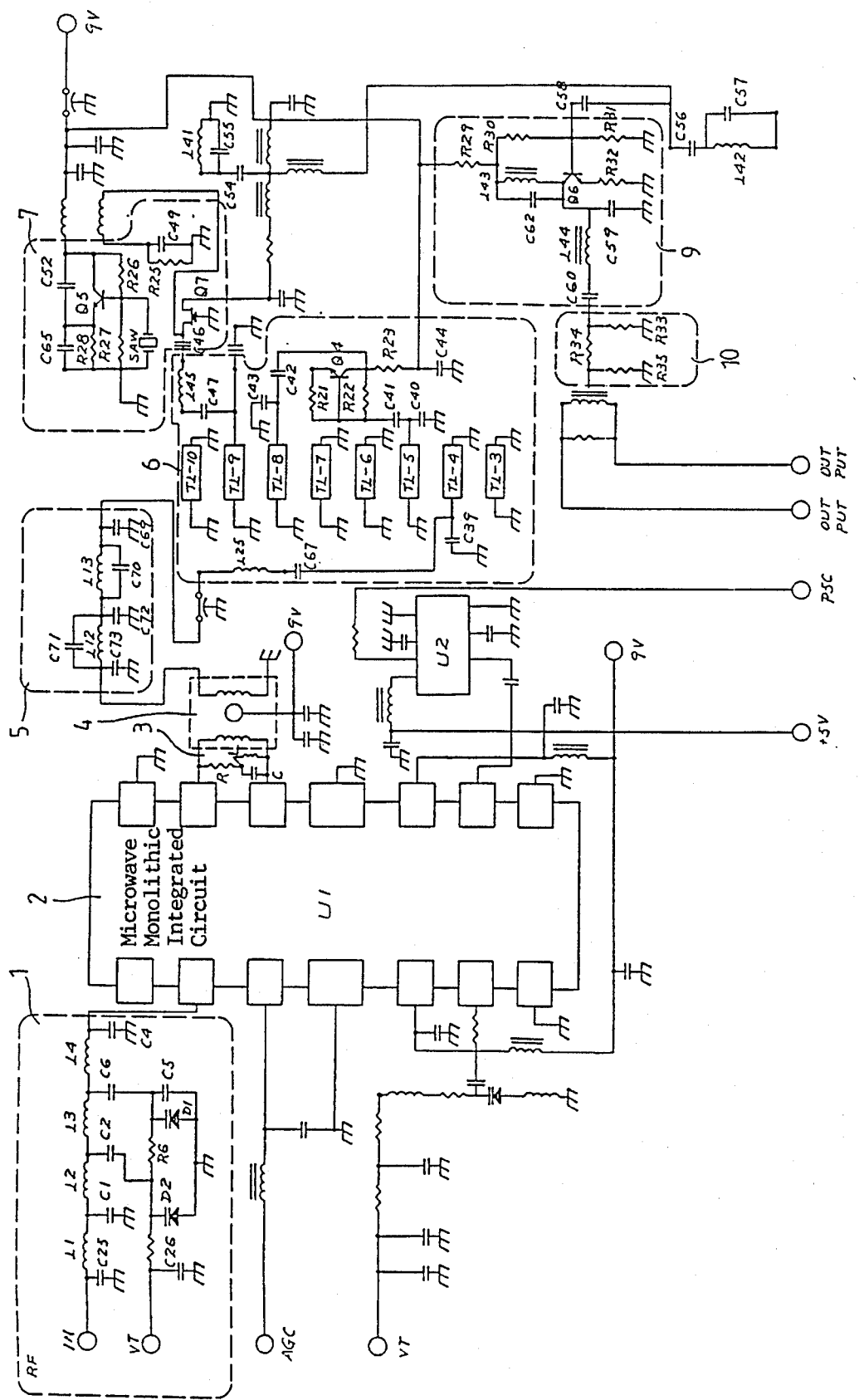
FIG. 2 is a circuit diagram for the CATV (cable television) tuner of the preferred embodiment of the present invention.

Referring to FIGS. 1 and 2, a CATV (cable television) tuner in accordance with the present invention is generally comprised of a tracking filter 1, a MMIC (microwave monolithic integreted circuit) 2, an inband and outband matching network 3, a BALUN (balance to unbalance) 4, a low pass filter 5, a double tuned circuit device 6, a secondary mixer 7, a trap 8, an ampli-filter 9, and an attenuator 10.

Referring to FIGS. 1 and 2 again, cable television radio signal (50 MHZ–560 MHZ) is sent to the tracking filter 1. The tracking filter 1, which is comprised of inductors L1, L2, L3 and L4, capacitors C1, C2, C4, C5, C6, C25 and C26, and variable capacitance diodes D1 and D2, tracks the selected channel signal and matches the impedance, and simultaneously removes the unnecessary signal. The output signal from the tracking filter 1 is then set to the MMIC 2, which is comprised of an integrated circuit U1.

The MMIC 2, which includes an amplifier, local oscillator, splitter, and mixers, is connected to the output terminal of the tracking filter 1 to amplify the output signal of the tracking filter 1, permitting the output of the amplifier to be mixed with the output of a first local oscillator and splitter so as to provide a balance type first intermediate frequency signal (612.75 MHZ). The first intermediate frequency signal is then through by the MMIC 2 to the inband and outband matching network 3, which is comprised of a resistor R, an inductor L, and a capacitor C.

The inband and outband matching network 3 is a resonance circuit of bandwidth 608.25–612.75 MHZ, which matches the intermediate frequency signal from the MMIC 2, i.e., when the bandwidth of the intermediate frequency signal is within 608.25–612.75 MHZ, the inband and outband matching network 3 is at the resonance status and works to increase the impedance of the intermediate frequency signal so that the intermediate frequency signal can be completely sent to the BALUN 4. On the contrary, if the bandwidth of the intermediate frequency signal is beyond 608.25–612.75 MHZ, the inband and outband matching network 3 is out of the resonance status, and the impedance of the intermediate frequency signal is maintained within about 75 Ohm, and therefore CTB (composite triple beat) is eliminated and, the intermediate frequency signal is prohibited from being reflected into the circuit.

The input terminal of the BALUN 4 is connected to the output terminal of the inband and outband matching network 3 to receive the intermediate frequency signal from the inband and outband matching network 3 when the inband and outband matching network 3 is at the resonance status. The output signal from the BALUN 4 is then sent to the low pass filter 5, which is comprised of capacitors C69, C70, C71 and C72, and inductors L12 and L13, to let portions of the signal over 620 MHZ be removed.

The double tuned circuit device 6 is comprised of LINE TL3–TL10, capacitors C39, C40, C41, C42, C43, C44, C47 and C67, resistors R21, R22 and R23, inductors L25 and L45, and a transistor Q4. The input terminal of the double tuned circuit device 6 is connected to the output terminal of the low pass filter 5 to receive its intermediate frequency signal and to let the intermediate frequency signal obtain the best gain and Q value. The output signal of the double tuned circuit device 6 is then sent to the secondary mixer 7, which is comprised of transistors Q5 and Q7, capacitors C46, C49, C52 and C65, resistors R25, R26, R27 and R28, and a SAW (surface acoustic wave resonator), so that the signal can be changed to the desired intermediate frequency signal or channel signal.

The trap 8 is comprised of capacitors C54, C55, C56 and C57, and inductors L41 and L42. The input terminal of the trap 8 is connected to the output terminal of the secondary mixer 7 to receive its output signal and to remove the sound carrier frequency and image carrier frequency of the nearby channels from the signal.

The output signal of the trap 8 is then sent to the ampli-filter 9, which is comprised of a transistor Q6, capacitors C60, C62 and C59, resistors R29, R30, R31 and R32, and inductors L43 and L44. The ampli-filter 9 amplifies the output signal of the trap 8 and removes noises from the amplified signal.

The attenuator 10 is comprised of resistors R33, R35 and R35. The input terminal of the attenuator 10 is connected to the output terminal of the ampli-filter 9 to receive its output signal and to attenuate the signal to 20 dB so as to obtain the desired optimum output return loss and impedance match that meet the required electric properties.

What is claimed is:

1. A cable television tuner comprising:

a tracking filter, which receives the signal from a cable television, tracks the selected channel signal, matches the impedance of the selected channel signal, and removes the unnecessary signal from the selected channel;

a microwave monolithic integrated circuit, which receives the output signal of said tracking filter and then amplifies the received signal so as to provide an intermediate frequency output;

an inband and outband matching network, which is a resonance circuit of bandwith 608.25–612.75 MHZ, comprised of a resistor, a capacitor, and an inductor, and which matches the intermediate frequency output signal of said microwave monolithic integrated circuit, said inband and outband matching network being at the resonance status and working to increase the impedance of the received intermediate frequency signal when the bandwith of the received intermediate frequency signal is within 608.25–612.75 MHZ, said inband and outband matching network being out of the resonance status and the impedance of the received intermediate frequency signal being maintained within about 75 Ohm so that composite triple beat is eliminated and the received intermediate frequency signal is prohibited from being reflected into the circuit when the bandwith of the received intermediate frequency signal is beyond 608.25–612.75 MHZ;

a changer, which receives the output signal of said inband and outband matching network when said inband and outband matching network is at the resonance status;

a low pass filter, which receives the output intermediate frequency signal of said changer and remove frequency over 620 MHZ from the signal;

a double tuned circuit device, which receives the output intermediate frequency signal of said low pass filter and adjusts the received intermediate frequency signal to let have the best gain and Q value;

a wave mixer, which receives the output intermediate frequency signal of said double tuned circuit device and changes the frequency of the received intermediate frequency signal to the desired intermediate frequency signal or channel signal;

a trap, which receives the output intermediate frequency signal of said wave mixer and removes the sound carrier frequency and image carrier frequency of the nearby channels from the received intermediate frequency signal;

an ampli-filter, which receives the output intermediate frequency signal of said trap and amplifies the received intermediate frequency signal and removes noises from the amplified signal; and an attenuator, which receives the output intermediate frequency signal of said ampli-filter and attenuates the signal so as to obtain an optimum radio frequency signal of good impedance match.

* * * * *